United States Patent

Fukumoto

[15] 3,654,808
[45] Apr. 11, 1972

[54] BAROMETER
[72] Inventor: Shoichi Fukumoto, Osaka, Japan
[73] Assignee: Fujiya Co. Ltd., Osaka, Japan
[22] Filed: June 29, 1970
[21] Appl. No.: 50,856

[30] Foreign Application Priority Data

July 2, 1969 Japan..................................44/52897

[52] U.S. Cl..............................................73/384, 116/129
[51] Int. Cl. ..........................................................G01l 7/12
[58] Field of Search....................73/384, 386, 170, 129 NA; 200/56; 340/266

[56] References Cited

UNITED STATES PATENTS 1,995,436  3/1935  Schofield.................................73/386
2,007,680  7/1935  Hanscom.................................73/386
739,126  9/1903  Vives....................................340/266

FOREIGN PATENTS OR APPLICATIONS 1,213,478  4/1960  France....................................340/266

*Primary Examiner*—Donald O. Woodiel
*Attorney*—Morgan, Finnegan, Durham & Pine

[57] ABSTRACT

A barometer comprising means for measuring atmospheric pressure, a barometric scale for indicating the measure atmospheric pressure, a scale pointer operatively connected to the measuring means and indicator means for directly indicating whether the atmospheric pressure is rising or falling. The indicator means is operated in response to movements of the measuring means to selectively give pressure rise and pressure fall indications.

1 Claims, 7 Drawing Figures

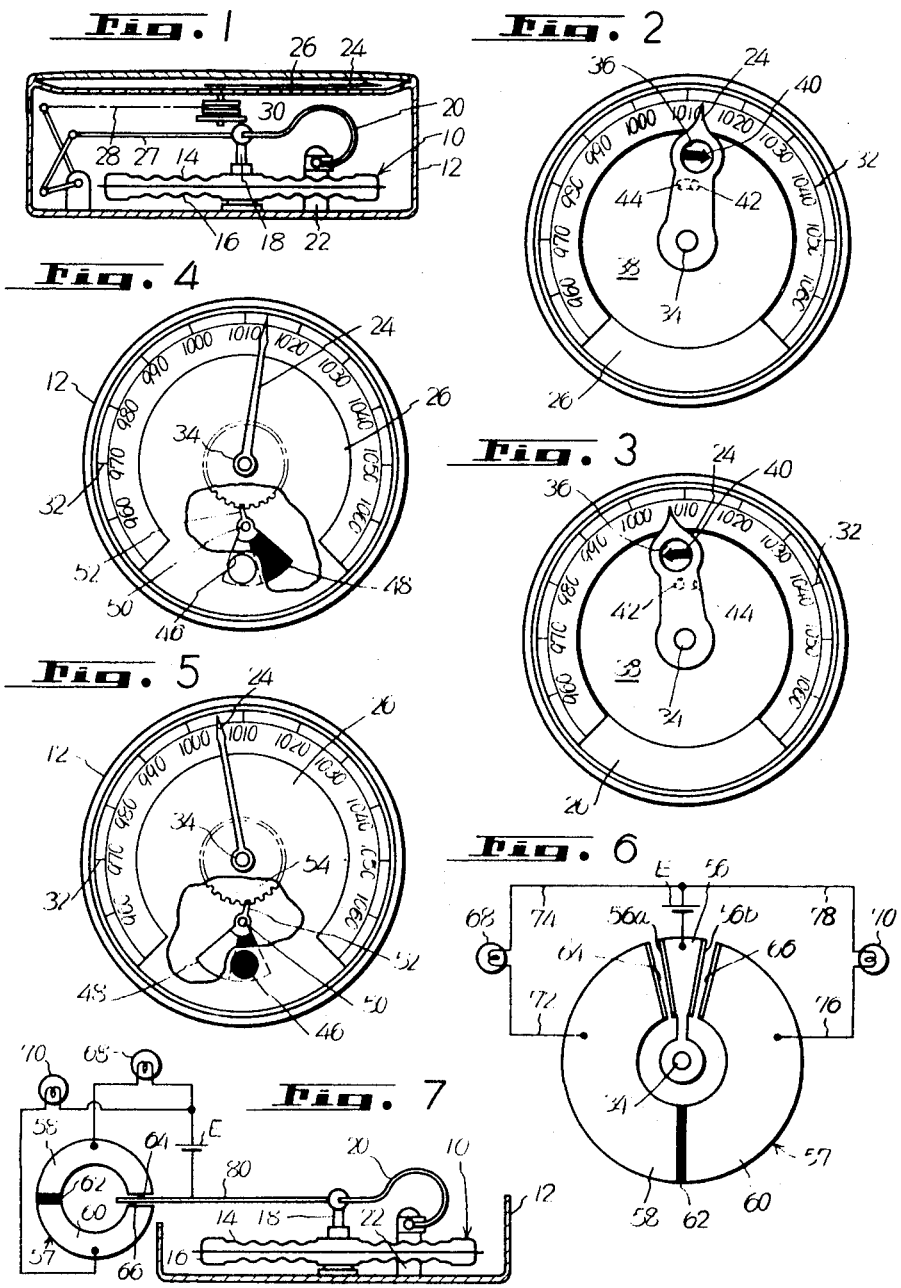

BAROMETER

BACKGROUND OF THE INVENTION

This invention relates to a new and improved barometer. In particular, this invention relates to a new and improved barometer having a novel mechanism capable of indicating whether atmospheric pressure is rising or falling.

The mercury barometer and the aneroid barometer are the two most practical instruments for measuring the pressure of atmosphere. Though the aneroid barometer does not have the reliability of a typical mercury barometer, it has extensive use in homes, offices, hotels and other living places because of its portability and relatively small size.

An aneroid barometer generally comprises a vacuum box formed by a pair of corrugated thin metal diaphragms which are hermetically sealed together along their peripheries. One face of the vacuum box is bolted to the base of a casing while the other is connected to a scale pointer through a suitable mechanical linkage. Movements of the upper face of the vacuum box caused by changing air pressure are transmitted to the scale pointer so that pressures can be read directly against a barometric scale provided on a face plate.

The aneroid barometers are commonly used in homes and offices not only to obtain a barometric reading at a given moment but also to get some indication of the trend in the weather. As is generally known stormy and rainy weather is normally associated with low atmospheric pressure while fair weather is characteristic of high atmospheric pressure. Thus, by taking the barometric readings on the scale of the barometer and noticing whether the pressure is rising or falling, it is possible to some extent to predict the weather.

In order to attempt a weather forecast based on the atmospheric pressure change it is important to observe the barometric tendency i.e. to observe whether the barometric pressure is rising or falling. This could be done by reading the barometric pressure directly from the scale pointer from time to time and comparing them with each other to know whether the barometric pressure is rising or falling. This is, however extremely troublesome and time consuming. Moreover the change in the atmospheric pressure is relatively slow and no rapid or steep change occurs unless an extraordinary weather condition takes place. Accordingly, the rotational sweeping movement of the pointer over the barometric scale on the face plate is also slow making it difficult for a user to notice the barometric tendency by a glance at the scale pointer. A suitable recording device can be incorporated into a barometer to write a record of atmospheric pressure change by moving a pen over a chart paper. With this instrument the user may readily notice whether pressure is rising or falling upon a glance at the chart paper. However, the barometer with such recording device does not provide a satisfactory solution since the recording device is complex in construction, difficult to operate and adds a substantial cost to the entire system.

Therefore, it is an object of this invention to provide a new and improved barometer having means for indicating whether the atmospheric pressure is rising or falling in such manner as to enable the user to notice it on a glance at the barometer.

It is another object of this invention to provide a novel mechanism for conspicuously indicating the barometric tendency which is simple in construction and can readily be incorporated into conventional barometers without causing a substantial design modification thereof.

It is still another object of this invention to provide a simple and inexpensive mechanism for conspicuously indicating whether the atmospheric pressure is rising or falling in response to the expansion and contraction movements of the vacuum box of a aneroid type barometer.

It is a further object of this invention to provide a new and improved barometer having a novel mechanism which is capable of indicating the barometric tendency and eliminates the necessity of a recording device.

SUMMARY OF THE INVENTION

In accordance with this invention an aneroid barometer is provided with a mechanism capable of indicating whether the atmospheric pressure is rising or falling. In one preferred embodiment the mechanism comprises a rotary member supported on a pointer shaft between a scale pointer and face plate for relative rotation with the shaft. A window or cut-out is formed in the scale pointer and cooperating markings for indicating whether the atmospheric pressure is rising or falling are provided on the rotary member at a radial position corresponding to the window. The scale pointer having the window therein is connected in driving engagement to the rotary member such that the marking for the pressure rise may appear in the window during a clockwise rotation of the scale pointer while the marking for the pressure fall may emerge in the window during a counterclockwise rotation of the pointer.

In another preferred embodiment the indicator mechanism comprises an indicator plate having a pair of markings which indicate the barometric rise and barometric fall respectively. The indicator plate is rotatably supported behind a window in the face plate and is connected in driven engagement to a pinion fixedly mounted on the pointer shaft such that a clockwise rotation of the scale pointer may cause the marking on the plate for the pressure rise to appear in the window while a counterclockwise rotation may cause the marking for the pressure fall to appear in the window.

In still another embodiment the mechanism comprises a pair of indicator lamps. The lamps are electrically connected through mechanical switching means to a suitable power supply. The switching means operates in response to the movements of the scale pointer or vacuum box of the barometer to selectively energize the indicator lamps. Energization of one lamp indicates that the atmospheric pressure is rising while energization of other lamp indicates the pressure is falling.

BRIEF DESCRIPTION OF THE DRAWINGS

In the accompanying drawings:

FIG. 1 is a cross sectional view of a typical aneroid barometer showing schematically the construction thereof;

FIG. 2 is a plan view of an aneroid barometer including a novel mechanism for indicating the barometric tendency according to one form of this invention and shows said mechanism is indicating a barometric pressure rise;

FIG. 3 is a view similar to FIG. 2 showing said mechanism indicating a barometric pressure fall;

FIG. 4 is a plan view, partially cut away, of an aneroid barometer including a novel indicator mechanism according to another form of this invention and shows said mechanism indicating an atmospheric pressure rise;

FIG. 5 is a view similar to FIG. 4 showing the mechanism indicating an atmospheric pressure fall;

FIG. 6 is a schematic view of an electric indicator mechanism according to still another form of this invention; and FIG. 7 is a schematic view of an electric indicator mechanism according to still another form of this invention together with associated parts of the barometer mechanism.

Like references are used to designate like parts all through the following embodiments of this invention.

Turning now to the drawings in detail, the preferred embodiments of the present invention have been illustrated in connection with the conventionally known aneroid barometer without necessarily limiting the scope of the invention thereto. FIG. 1 schematically shows a typical form of the aneroid barometer which comprises a vacuum box 10 positioned within a casing 12. The vacuum box is formed by two corrugated thin metal diaphragms 14 and 16 hermetically sealed together along their outer peripheries by means of welding, brazing or the like. The center of the lower metal diaphragm 16 is secured to the base or bottom of the barometer casing while the center of the upper metal diaphragm 14 is connected to a shaft cylindrical rod 18 which supports the free end of a leaf spring 20. The other end of the spring 20 is fixedly secured to a support block 22 which is mounted also to the bottom of the casing 12. With this arrangement the free end of the leaf spring 20 normally biases the vacuum box 10 into its expanded condition against atmospheric pressure. A rise in the atmospheric pressure causes the upper face of the vacuum box 10 to depress or move downwardly toward the lower face of the box while a fall in the atmospheric pressure permits the upper face of the FIG. 6) vacuum box to expand or move upwardly away from the lower face under the influence of the biasing force of the spring 20. Thus, the upper face of the vacuum box 10 moves vertically up and down in response to changing atmospheric pressure. Movements of the upper face of the vacuum box are transmitted to a scale pointer 24 through a suitable mechanical linkage which, in the illustrated barometer, includes a connecting rod 27, a chain 28 and a recessed wheel 30. Up and down movements of the upper face the vacuum box, 10 raise and lower the rod 18. The movement of the rod 18 is converted through the linkage into a rotational movement of the pointer 24 and a barometric reading is obtained against a scale on a face plate 26.

FIGS. 2 and 3 show an aneroid barometer embodying one preferred form of this invention. The barometer includes a face plate 26 which has marked thereon a suitable pressure scale 32. A shaft 34 projects outwardly in the center portion of the face plate 26 to support scale pointer 24. As hereinabove explained in connection with FIG. 1, expansion and contraction movements of the vacuum box caused by atmospheric pressure changes are transmitted to the shaft 34 to rotate the same. Since the pointer 24 is fixedly mounted on this shaft, a rotational movement of the shaft causes a simultaneous rotation of the pointer with its free end sweeping over the barometric scale 26 to provide a barometric reading. A circular window 36 is formed in this scale pointer for the purpose hereinafter described in detail.

In accordance with the present invention a disc 38 is mounted on the shaft 34 between the face plate and pointer for relative rotational movement with respect to the shaft. An indication mark 40 in the form of an arcuate strip having an arrow at both ends is provided on the rotary disc 36 at a radial position generally corresponding to the circular window 36 in the scale pointer. The arrow ended mark 40 is provided to indicate the barometric tendency and has an angular extension or length longer than the diameter of the window 36. As shown in a dotted line a short pin or projection 42 is attached to the back of the pointer to extend into a cooperating arcuate slot 44 formed in the rotary disc 38.

With this arrangement of the barometer when atmospheric pressure rises the scale pointer 24 is driven by the support shaft 34 to rotate in clockwise direction. A slight clockwise rotation of the pointer brings the rear projection 42 into engagement with the right edge of the arcuate slot 44. At this moment, as shown in FIG. 2, the right hand arrow of the arrow ended mark 40 on the rotary disc appears in the window 36 of the scale pointer indicating that the air pressure is rising. A continued rise in the atmospheric pressure causes the scale pointer to move further in the clockwise direction thereby pushing the rotary disc in the same direction. Accordingly, as long as the atmospheric pressure rises the left hand arrow continues to appear in the window 36 of the scale pointer, thereby conspicuously indicating that pressure is rising. On the other hand, when the atmospheric pressure changes to fall the scale pointer 24 is driven in counterclockwise direction and after a slight counterclockwise rotation of the pointer its rear projection 42 comes into engagement with the left edge of the arcuate slot 44. At this time the left hand arrow of the arrow ended mark 40 emerges in the window of the pointer as shown in FIG. 3. A continued fall in air pressure drives the scale pointer 24 to rotate further in counterclockwise direction carrying together the rotary disc 38 in that direction. Thus, during atmospheric pressure fall the left hand arrow continues to appear in the window 36 of the scale pointer and clearly shows that the pressure is falling. With this construction of the barometer, the barometric tendency is so conspicuously indicated by the arrows of the marking 40 which selectively appear in the window that the user may readily notice on a mere glance at the window 36 whether the atmospheric pressure is rising or falling at a given moment. This successfully saves the user the troublesome work of taking barometric readings from time to time to know the trend in pressure changes. The window 36 in the scale pointer, the marking 40 on the rotary disc and the slot 44 in the disc are not limited in their shape and size to those illustrated in FIGS. 2 and 3 and any suitable form and size may be selected for them. The only essential point in this indicator arrangement is to dispose the slot and projection with respect to the marking and window such that the right hand arow of the marking may appear upon a slight clockwise rotation of the scale pointer while the lefthand arrow may appear upon a slight counterclockwise rotation of the pointer. Also, in this connection the angular extension of the slot must carefully be selected in relation to that of the marking on the face plate. Further for a quick indicative exchange in response to the reversal of the barometric change the slot 44, marking 40 on the rotary disc and window 36 may preferably be formed to have a small angular dimension.

FIGS. 4 and 5 illustrate an aneroid type barometer embodying another form of this invention. In this embodiment the barometric tendencies are shown by colored markings instead of the arrows. As shown in the drawings, the face plate 26 is provided at a proper position with a circular window 46 and a sector plate 48 is mounted at the back of the face plate to cover the circular window. More specifically, the sector plate 48 has an areal dimension at least twice as great as that of the window and is pivoted by a pin 50 to the back surface of the face plate. The sector plate is further provided at its apex with a projection 52 which is in operative engagement with a pinion 54. The pinion is fixedly mounted on the shaft 34 at the back of the face plate 26 for rotation therewith. Clockwise or counterclockwise rotation of the shaft 34 caused by changing air pressure is transmitted through the meshing engagement between the pinion 54 and projection 52 to the sector plate 48 which is rotatably supported by the pin 52. Thus, as the shaft rotates together with the scale pointer 24 the sector plate 48 is driven towards its right position as shown in FIG. 4 and its left position as shown in FIG. 5 depending upon the direction of rotation of the shaft. The areal dimension of the window 46 being less than half of the areal dimension of the sector plate 48, the sector plate is disposed with respect to the window such that the right half portion of the sector plate may appear in the window in its leftmost position and conversely the left half portion of the sector plate may emerge in the window as the plate moves into the rightmost position. For the ease of discrimination, two half portions of the front sector surface may preferably be painted or otherwise be coated in distinct different colors, for example, red for the right half and blue for the left half.

With this indicating arrangement, as the scale pointer 24 moves in clockwise direction in response to the rise in atmospheric pressure it also drives the sector plate 48 to rotate in counterclockwise direction on the pin 50. Upon a predetermined range of the barometric change the sector plate is moved into its rightmost position and the blue colored left half of the sector surface appears in the window 46 as shown in FIG. 4 to thereby noticeably show the rising barometric tendency. As the atmospheric pressure beings to fall the pointer 24 moves in counterclockwise direction and the sector plate is driven through operative engagement between the pinion 54 and projection 52 in clockwise direction. When this barometric fall reaches a predetermined range the sector is rotated into its leftmost position as shown FIG. 5 and the red colored right half of the sector plate appears in the window 46 indicating that the pressure is falling. The user has only to glance at the window 46 in order to notice whether the barometric pressure is rising or falling;. In this embodiment as in the previous one, relative size and positioning of the pinion, projection, sector plate and window must suitably be selected so that a slight angular displacement of the scale pointer after a reversal of rotation caused by atmospheric pressure change may effectively change the indication in the window.

In the above described two embodiments of this invention mechanical means are used to show the indication of the barometric tendency in the window in response to angular displacement of the scale pointer. As pointed out above, some difficulty may arise with the mechanical indication in obtaining the quickest possible indicative response to the reversal of the barometric change. That is, a complete change of the indication in the window is not effected until a predetermined range of barometric change is reached after the reversal of the pressure change from rising to falling tendencies or from falling or rising tendencies. If the barometric change is extremely slow it may take some time before the indication is completely interchanged. Or, if the barometric change does not reach a predetermined range, the indication may not be completely interchanged and an incomplete or indefinite indication may appear in the window making it difficult for the user to know whether the pressure is rising or falling. These difficulties can be successfully avoided as explained above by a suitable selection of the relative position and dimension of the constituent parts of the indication mechanism. However, for a more complete and highly responsive indication mechanism electrical means may preferably be employed.

In FIG. 6 there is illustrated another mechanism for indicating whether the atmospheric pressure is rising or falling which includes electrical means and which can readily be incorporated into the aneroid barometer. The mechanism comprises switching means including an electrically conductive movable contact 56 fixedly mounted on the pointer shaft 34. The movable contact has a pair of opposite contact surfaces 56a and 56b. A split conductive ring 57 is supported for free follower motion with respect to the movable contact 56. As shown in the drawing the following ring 57 is formed by a pair of semicircular ring segments 58 and 60. Segments 58 and 60 are attached together but electrically insulated from each other by an insulation 62. The follower ring is disposed with respect to the movable contact 56 such that two end contact surfaces 64 and 66 of the ring may respectively face the contact surfaces 56a and 56b of the movable contact with a close gap therebetween. As the movable contact rotates in either clockwise or counterclockwise direction it engages one end surface of the follower ring 57 and pushes the ring along with it. level The electric indication mechanism further includes a pair of indication lamps 68 and 70 and a suitable power source E. One terminal of the first lamp 68 is connected through a conductor 72 to semicircular ring segment 72 while the other terminal of the lamp is connected through a lead conductor 74 to one terminal of the power supply E. One terminal of the second lamp 70 is connected through a lead conductor 76 to ring segment 60 while the other terminal is connected via a conductor 78 to one terminal of power supply E. The other terminal of power supply E is joined to the movable contact element 56. Indicating lamps 68 and 70 may be disposed on the face plate (not shown) at suitable locations and may have different colors for the same purpose as hereinabove explained.

With this indicating arrangement, as the scale pointer (not shown) moves in clockwise direction in response to a rise in atmospheric pressure, the movable contact mounted on the pointer shaft 34 also moves in clockwise direction. Only a slight rotation of the pointer in that direction brings contact surface 56b of the movable contact into direct engagement with end surface 66 of the ring segment 60, thereby establishing an electrical circuit from the ring element 60 through conductor 76, second lamp 70, conductor 78, power supply E, movable contact 56 and back to the segment 60. The second lamp 70 is thus turned on to indicate the barometric pressure is rising. As long as the barometric pressures rises the scale pointer continues to move in the clockwise direction keeping the contact surface 56b in pushing engagement with the end surface 66. The second lamp is kept turned on. When the barometric pressure turns to fall the scale pointer together with the movable contact element 56 reverses its rotational movement. As the result, the contact element 56 moves away from the end surface 66 of the ring segment breaking the electric circuit through the second indication lamp 70 and the lamp is turned off. A continued fall in atmospheric pressure causes the contact element 56 to rotate further in counterclockwise direction and brings the other contact surface 56a of the movable contact element in engagement with end surface 64 of the ring segment 58. This establishes an electric circuit from ring segment 58 through conductor 72, first indicator lamp 68 conductor 74, power supply E, movable contact 56 and back to ring segment 58 turning the lamp 68 on to indicate the atmospheric pressure is falling. The movable contact element 56 is kept in pushing engagement with the end surface 64 and the first lamp is held turned on while the pressure falls. Another reversal of the pressure change moves the contact element 56 away from the end surface 64 toward the other end surface 66 in the same manner as explained above and the lamp 68 is turned off as the result of a breakage in the circuit therethrough between contact surfaces 56a and 64.

Upon a look at the indication lamps the user may readily notice whether the atmospheric pressure is rising or falling. In this embodiment it is also possible to cut out a pair of oppositely directed arrows in the face plate which indicate rising and falling pressure respectively and to light these cutout arrows by the indication lamps 68 and 70, respectively:

FIG. 5 illustrates another form of an electrical indication mechanism according to this invention. As shown in the drawing, an elongated horizontal contact blade or strip 80 made of a conductive material is connected to the vertical rod 18 which is attached to the upper corrugated metal diaphragm 14. As is already explained in connection with FIG. 1, the rod moves vertically along its axis according to the expansion and contraction movements of the vacuum box 10 caused by changing air pressure. Near the free end of the contact blade 80 there is positioned an electrically conductive split ring 57 with two end surfaces 64 and 66 facing in close proximity to the corresponding surfaces of the contact blade. The conductive follower ring 57 is rotatably supported and comprises a pair of ring segments 58 and 60 which are mechanically attached together but are electrically insulated from each other by an insulation 62 interposed therebetween. The indication mechanism further includes first and second indication lamps 68 and 70. The electric circuit involving these lamps is substantially similar in construction to that shown in FIG. 6. Accordingly, no detailed description is given with respect to the circuit construction.

In operation, as the atmospheric pressure rises a contraction of the vacuum box 10 pulls the rod 18 vertically downward. Upon a slight downward motion of the rod the free end of the elongated contact blade 80 engages the lower end surface 66 of the follower ring 57 to complete an electric circuit through the second lamp 70 in the same manner as explained above. The lamp is then switched on to indicate the pressure is rising. Conversely, as the atmospheric pressure changes to fall an expansion of the vacuum box 10 moves the rod 18 vertically upward bringing the free end of the contact blade 80 away from the lower end surface 66 into engagement with the upper end surface 64 of the follower ring. The electric circuit through the second lamp 70 is broken and an electric circuit through the first lamp 68 is then completed to turn this lamp on, which indicates the pressure is falling.

In these two embodiments which have electrical means incorporated therein it is easy to reduce the gap or space between the two facing contact surfaces to a minimum. With such minimum gap between the facing surfaces the slightest mechanical displacement of the movable contact or contact blade is required to effect the desired switching operation. Phrased differently, a small atmospheric change as detected by the vacuum box can operate the indicator lamp circuit through the movable contact element or contact blade to selectively turn on the lamps so that a delayed indicative response as mentioned above could successfully be avoided.

By employing suitable integrator or differentiator means on in the described mechanism it is possible to indicate the rate and amount of atmospheric pressure change.

While only a few preferred embodiments have been described above, it is to be understood that this invention is not limited to the particular embodiment disclosed and that it is intended to cover all modifications which are within the true spirit and scope of this invention as claimed.

What is claimed is:

1. A barometer comprising:
a casing;
a face plate fixedly mounted in the casing;
a barometer scale peripherally disposed on the face plate;
a rotatable shaft extending through the face plate;
a scale pointer fixedly mounted on the rotatable shaft for sweeping movement over the face plate;
means for rotating the scale pointer in one direction as the atmospheric pressure rises and in the opposite direction as the atmospheric pressure drops;
a window formed at a fixed position in the face plate;
a gear fixedly mounted on the rotatable shaft for coincident movement with the scale pointer;
a pivotally mounted sector plate about twice the areal size of the window, which sector plate is located under the window;
a left hand side of the sector plate having a first color;
a right hand side of the sector plate having a second color; and
a tooth integrally formed with the sector plate extending from the pivot mount of the sector plate, in a direction directly opposite the sector plate, to the gear for engagement with the two teeth in alignment therewith;
whereby rotation of the scale pointer in a clockwise direction will be accompanied by rotation of the sector plate to urge the right hand side of the sector plate into registry with the window and rotation of the scale pointer in the counterclockwise direction urges the left hand side of the sector plate into registry with the window.

* * * * *